United States Patent
Khan et al.

(10) Patent No.: US 11,630,998 B2
(45) Date of Patent: Apr. 18, 2023

(54) SYSTEMS AND METHODS FOR AUTOMATICALLY TRAINING NEURAL NETWORKS

(71) Applicant: Cohda Wireless Pty Ltd., Wayville (AU)

(72) Inventors: Malik Khan, Wayville (AU); Mohamed Elbanhawi, Wayville (AU)

(73) Assignee: Cohda Wireless Pty Ltd., Wayville (AU)

( * ) Notice: Subject to any disclaimer, the term of this patent is extended or adjusted under 35 U.S.C. 154(b) by 1058 days.

(21) Appl. No.: 16/364,733

(22) Filed: Mar. 26, 2019

(65) Prior Publication Data
US 2019/0294966 A1 Sep. 26, 2019

(30) Foreign Application Priority Data
Mar. 26, 2018 (AU) ............................... 2018900999

(51) Int. Cl.
*G06N 3/08* (2006.01)
*H04W 4/46* (2018.01)
(Continued)

(52) U.S. Cl.
CPC .............. *G06N 3/08* (2013.01); *B60W 50/00* (2013.01); *G01S 13/00* (2013.01); *G06K 9/6256* (2013.01);
(Continued)

(58) Field of Classification Search
CPC .......... G06N 3/08; G06N 3/008; G06N 20/58; B60W 50/00; B60W 2554/00;
(Continued)

(56) References Cited

U.S. PATENT DOCUMENTS 6,014,652 A * 1/2000 Hill .................... G01N 29/2425
706/15
2018/0068206 A1 3/2018 Pollach et al.
(Continued)

FOREIGN PATENT DOCUMENTS

WO WO-2017120336 A2 7/2017

OTHER PUBLICATIONS

"European Application No. 19165286.6, Extended European Search Report dated Aug. 5, 2019", (Aug. 5, 2019), 8 pgs.
(Continued)

Primary Examiner — Marthe Y Marc-Coleman
(74) Attorney, Agent, or Firm — Schwegman Lundbrg & Woessner, P.A.

(57) ABSTRACT

A method for automatically training a neural network includes at a trainer having a first communication device and a perception recorder, continuously recording the surroundings in the vicinity of the first object; receiving, at the trainer, a message from a communication device associated with an object in the vicinity of the trainer, the message including information about the position and the type of the object; identifying a recording corresponding to the time at which the message is received from the object; correlating the received positional information about the second object with a corresponding location in the recording to identify the object in the recording; classifying the identified object based on the type of information received in the message from the object; and using the classified recording to train the neural network.

17 Claims, 9 Drawing Sheets

(51) Int. Cl.

| | |
|---|---|
| *G06K 9/62* | (2022.01) |
| *H04W 4/38* | (2018.01) |
| *G01S 13/00* | (2006.01) |
| *H04W 4/00* | (2018.01) |
| *B60W 50/00* | (2006.01) |
| *H04W 4/40* | (2018.01) |
| *G06N 3/00* | (2006.01) |
| *G06V 20/56* | (2022.01) |
| *G06V 20/58* | (2022.01) |
| *H04W 4/18* | (2009.01) |
| *H04L 67/12* | (2022.01) |
| *H04W 4/02* | (2018.01) |
| *G01S 13/86* | (2006.01) |
| *G01S 17/931* | (2020.01) |
| *G05D 1/02* | (2020.01) |
| *G06N 3/008* | (2023.01) |

(52) U.S. Cl.
CPC ............ *G06K 9/6267* (2013.01); *G06N 3/008* (2013.01); *G06V 20/56* (2022.01); *G06V 20/58* (2022.01); *H04W 4/00* (2013.01); *H04W 4/38* (2018.02); *H04W 4/40* (2018.02); *H04W 4/46* (2018.02); *B60W 2554/00* (2020.02); *G01S 13/865* (2013.01); *G01S 17/931* (2020.01); *G05D 1/0246* (2013.01); *H04L 67/12* (2013.01); *H04W 4/02* (2013.01); *H04W 4/185* (2013.01)

(58) Field of Classification Search
CPC ... B60W 40/09; B60W 2540/30; G01S 13/00; G01S 13/865; G01S 17/931; G01S 7/417; G01S 13/867; G01S 2013/9323; G01S 2013/9316; G01S 2013/9324; G01S 13/86; G01S 13/931; G01S 15/931; G01S 17/89; G06K 9/6256; G06K 9/6267; G06K 9/00536; G06V 20/56; G06V 10/82; G06V 40/10; H04W 4/00; H04W 4/38; H04W 4/40; H04W 4/46; H04W 4/02; H04W 4/185; G05D 1/0246; H04L 67/12; G06F 1/12; G08G 1/162; G08G 1/163

See application file for complete search history.

(56) References Cited

U.S. PATENT DOCUMENTS

| | | |
|---|---|---|
| 2019/0065951 A1* | 2/2019 | Luo ........................ G08G 1/162 |
| 2019/0073545 A1 | 3/2019 | Dolgov et al. |
| 2019/0164049 A1 | 5/2019 | Bai et al. |

OTHER PUBLICATIONS

"Australian Application No. 2019202088, Examination report No. 3 for standard patent application dated Mar. 31, 2021", (Mar. 31, 2021), 7 pgs.

"European Application No. 19165286.6, Communication pursuant to Article 94(3) EPC dated Mar. 12, 2021", (Mar. 12, 2021), 6 pgs.

Mahjoub, Hossein Nourkhiz, et al., "A Learning-based Framework for Two-Dimensional Vehicle Maneuver Prediction Over V2V Networks", In Proceedings of IEEE 15th Intl Conf on Dependable, Autonomic and Secure Computing, 3rd Intl Conf on Big Data Intelligence and Computing and Cyber Science and Technology Congress, Orlando, FL, 2017, pp. 156-163, XP033342533, (Nov. 6, 2017), 156-163.

* cited by examiner

SYSTEMS AND METHODS FOR AUTOMATICALLY TRAINING NEURAL NETWORKS

CLAIM OF PRIORITY

This application claims the benefit of priority of Australia Patent Application No. 2018900999, filed on 26 Mar. 2018, the benefit of priority of which is claimed hereby, and which is incorporated by reference herein in its entirety.

TECHNICAL FIELD

Aspects of the present disclosure related to training neural networks and in particular to methods, systems and machine-readable-mediums for automatically classifying items and/or training neural networks.

BACKGROUND

In general, machine learning networks such as artificial neural networks (referred to as neural networks hereinafter) include interconnected artificial nodes called 'neurons' that generally mimic a biological neural network. Typically, the network includes a set of adaptive weights (i.e. numerical parameters that are tuned by training the network to perform certain complex functions).

Training a neural network typically involves providing the network with a large training data set (for the type of data the neural network is supposed to handle once implemented). For example, in case the neural network is designed to identify/classify objects on roads and notify drivers/vehicles of any potential dangers or obstacles on the road, the training set should include images (typically from multiple different angles) of various types of objects/vehicles/infrastructure elements that might be encountered on a road along with information about the objects so that the neural network can learn to identify objects on the road in real time.

Often the neural network is trained by first generating an appropriate amount (such as several hundred hours) of camera footage of roads/motorways/highways. Subsequently, the footage is tagged (i.e. in each frame of the captured footage, objects (such as traffic signals, poles, pedestrians, cyclists, and motor vehicles) are manually identified and classified). Next, the tagged data is fed to the neural network, which is trained to estimate the tags (i.e. identify the objects) in an image based on the content of the image. During the training process, an image is fed to the neural network and based on the weights of the networks, an output from the many possible outputs is selected. If the output is incorrect, the network changes its weightings to be more likely to produce the correct output. This process is repeated numerous times with multiple images, until the neural network can correctly identify and classify objects most of the time. It will be appreciated that the more the process is repeated and the more varied the training set is, the more accurate the network will be.

Most techniques used for training neural networks are labour-intensive in terms of generating and tagging training data sets. Further, it will be appreciated that the accuracy of the network is dependent on the accuracy of the person/program (classifier) that classifies objects in images to begin with. When the neural network is intended to be used to control traffic/alert vehicles (especially driverless vehicles) of potential obstacles and dangers, accuracy becomes very important and the classifier's accuracy becomes a matter of trust (i.e. should the classification be trusted and also more importantly should the classifier be trusted).

Thus, the challenges in implementing neural networks in vehicles include generating and classifying large training data sets and validation of the training data sets. Both are very important as they are central to any artificial intelligence-based learning approach.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY

A first aspect of the present disclosure provides a method for automatically training a neural network associated with a trainer, the trainer having a first communication device and a perception recorder, the method including: at the perception recorder, recording the surroundings in the vicinity of the trainer receiving, at the trainer, a communication message from a communication device associated with an object in the vicinity of the trainer, the message including positional information about the object and information about the type of the object; identifying a portion of the recording from the perception recorder that corresponds to a time at which the communication message is received from the object; identifying the object in the identified portion of the recording by correlating the positional information about the object received in the communication message with a corresponding location in the identified portion of the recording; classifying the identified object based on the information about the type of the object received in the communication message; and using the classified identified object to train the neural network.

A second aspect of the present disclosure provides a method for automatically training a neural network associated with a trainer, the trainer having a first communication device and a perception recorder, the method including: at the perception recorder, recording the surroundings in the vicinity of the trainer isolating one or more objects in the recording and attaching positional and timing information to each of the isolated one or more objects, the positional information indicating the location of the corresponding object with respect to the trainer and the timing information indicating a time at which the corresponding object was in that position; receiving, at the trainer, a communication message from a communication device associated with a first object in the vicinity of the trainer, the message including positional information about the first object and information about the type of the first object; matching a time at which the message is received with the timing information of the isolated one or more objects and matching the positional information received in the message with the positional information of the isolated one or more objects to identify the first object in the recording; classifying the identified first object based on the information about the type of the object; and using the classified recording to train the neural network.

A third aspect of the present disclosure provides a method for training a neural network, the method including: at a vehicle having a first communication device and a vehicle condition recorder, the first communication device configured to receive communication messages from one or more objects in the vicinity of the vehicle and the vehicle condition recorder configured to continuously record a condition of the vehicle; receiving, at the vehicle, a first communication message from a communication device associated with an object in the vicinity of the vehicle, the first communication message including positional information about the object and information about the type of the object; determining a surrounding state of the vehicle based on the received communication message, the surrounding state including at least a position of the object with respect to the vehicle; identifying a vehicle state corresponding to a time at which the communication message is received from the object; correlating the determined surrounding state of the vehicle with the corresponding vehicle state and storing in the form of correlated state data; classifying the correlated state data; and using the classified correlated state data to train the neural network.

Further aspects of the present disclosure and further embodiments of the aspects described in the preceding paragraphs will become apparent from the following description, given by way of example and with reference to the accompanying drawings.

DETAILED DESCRIPTION

Overview

Figure 1:
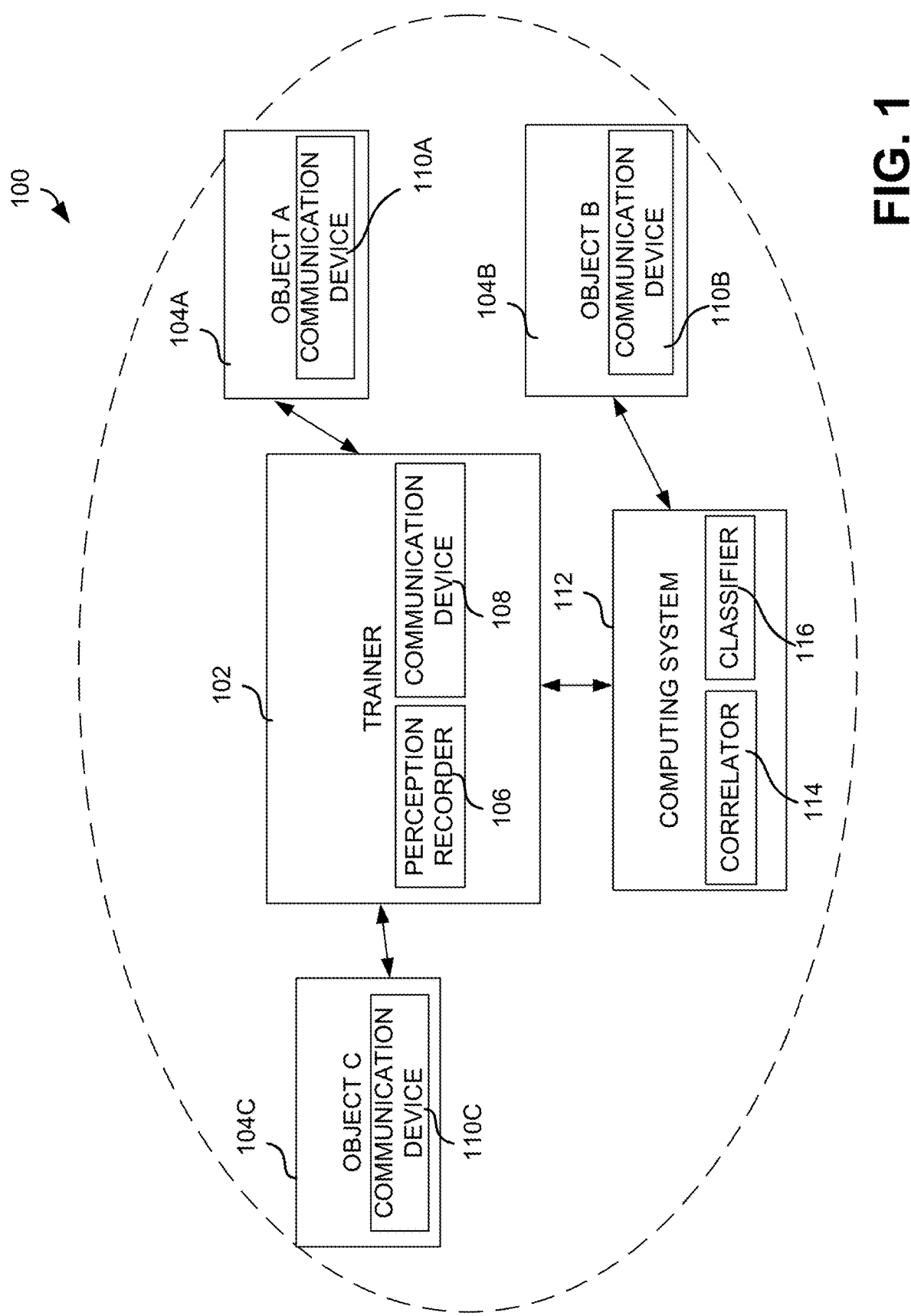
FIG. 1 illustrates an example environment where aspects of the present disclosure may be implemented.

Disclosed herein is a method, a system and a non-transitory machine-readable medium for automatically training neural networks or classifiers of neural networks in a secure manner. In particular, some of the disclosed systems and methods automatically classify objects and provide recordings of the classified objects to neural networks for training purposes. Other disclosed systems and methods generate training data for neural networks to learn driver behaviour.

The present disclosure is described with reference to a connected vehicle ecosystem, where vehicles share data wirelessly with other vehicles, infrastructure, transport management systems, and mobile devices. This ecosystem is commonly referred to as a cooperative Intelligent Transport System (C-ITS). In the C-ITS, vehicles cooperatively work together to ensure safety and mobility when vehicles are operated.

Typically, the vehicles in such an ecosystem are equipped to accurately identify and understand the vehicle's surroundings so that the vehicle can be manoeuvred to its destination safely. In particular, in autonomous driving ecosystems, vehicles constantly detect their surroundings to identify other vehicles, obstacles, or infrastructure (such as lampposts, traffic lights, bridges, etc.) so that the vehicles can determine an optimum route, driving speed, etc., based on environmental conditions/state.

To do this (i.e. to identify objects and make driving decisions in real time), such vehicles are typically equipped with powerful computing systems which may include trained neural networks that can make decisions in real time based on received/perceived environment state. As described previously, to train such a neural network a large data set of tagged/classified images are required so that the neural network can understand what different objects look like from different angles and at different times of the day and use this knowledge to identify and classify objects in real time.

Aspects of the present disclosure provide a new method and system for automatically creating data for training neural networks. In particular, the systems and methods disclosed herein automatically create training data and automatically classify that training data set. To do this, one or more objects in the vehicle ecosystem can become network trainers. The trainers utilize one or more perception sensing devices that continuously record the trainer's surroundings and a communication network that allows objects in the trainers' surroundings to communicate information such as their identification, position, and/or the layout in their vicinity to the trainers. The trainers can then use information from the perception sensor recordings together with the information from the received communication to accurately identify and classify objects in the trainer's vicinity.

Other aspects of the present disclosure provide a new method and system for generating training data for training neural networks to automate one or more functions of a vehicle. To do this, a vehicle in the vehicle ecosystem, utilizes a vehicle condition recorder that records the vehicle's state and a communication network that allows objects in the vehicle's vicinity to communicate information such as their identification, position, and/or the layout in their vicinity to the vehicle. The computing systems connected to the vehicle can then use information from received communication to determine the vehicle's surrounding state at a particular time and correlate this with the vehicle's state at that particular time to accurately identify human driver behaviour associated with the vehicle's surround state.

It will be appreciated that although the systems and methods are described with respect to C-ITS ecosystems, the teachings disclosed herein can be implemented in other environments with suitable modifications and without departing from the scope of the present disclosure. For example, the presently disclosed systems and methods can be utilized to classify electronic items in a home.

System Overview

FIG. 1 illustrates an exemplary network environment/vehicle ecosystem 100 in which some aspects of the present disclosure may be implemented. The environment 100 includes a trainer 102, and objects 104A, 104B, and 104C (collectively referred to as objects 104) in the vicinity of the trainer 102. The trainer is equipped with a perception recorder 106 and a communication device 108. One or more of the objects 104 are also equipped with a communication device 110 (in FIG. 1 these are illustrated as communication devices 110A, 110B, and 110C). Further, the trainer 102 may be communicatively coupled with a computing system 112, which includes a correlator 114 and a classifier 116.

In certain embodiments, the trainer 102 may be an infrastructure element such as a traffic signal, whereas in other embodiments it may be an automated vehicle. Generally speaking, automated vehicles are vehicles that have one or more primary driving controls (steering, acceleration, braking) automated for a sustained period of time. Classification of automated driving levels, which consider what role the human driver has and whether the human is 'in-the-loop' or not, are often used to define the level of automation in motor vehicles. Levels of automation range from no automation of driving controls, through automated applications that assist the human with the driving task, through to fully and highly automated vehicles that are autonomous and can drive themselves.

As described previously, the trainer 102 is equipped with a perception recorder 106 that includes one or more perception sensors. The perception sensors are configured to monitor/sense a vicinity of the trainer 102 and forward this to the computing system 112. The perception sensors may include, for example, radars, video cameras, infrared sensors, ultrasonic sensors, light detection and ranging (LIDAR) sensors, and so on. Further, the perception sensors may be directional (e.g., configured to sense/monitor a few meters in a particular direction) or omnidirectional (e.g., configured to sense/monitor a 360° area around the object in a scanning pattern).

The communication device 108 may be any suitable device that is capable of receiving communication messages from other objects 104 in the vehicle ecosystem 100 and transmitting communication messages to other objects 104 in the ecosystem. For example, the communication device 108 may be configured to allow vehicle-to-everything (V2X) communication, which includes other more specific types of communication such as V2I (Vehicle-to-Infrastructure), V2V (Vehicle-to-vehicle), V2P (Vehicle-to-Pedestrian), V2D (Vehicle-to-device) and V2G (Vehicle-to-grid) communication. V2X communication is generally based on wireless LAN technology and works directly between devices (when they are in range of each other). It therefore does not require any infrastructure for objects to communicate with each other. In other embodiments, the communication device 108 may be configured to allow LTE, C-V2X, and/or WIFI communication without departing from the scope of the present disclosure.

The objects 104 in the vehicle ecosystem 100 may be other vehicles, infrastructure elements, pedestrians, or cyclists. One or more of the objects is also equipped with one or more communication devices 110 similar to the communication device 108. When the trainer 102 is within range of an object 104, the communication device 110 associated with that object automatically sends a message to the trainer 102. The message may include identification information about the object (e.g., describing what the object is—a lamp post, a traffic signal, a Mitsubishi Lancer, a 10 m bus, etc.) and positional information about the object (e.g., GPS coordinates of the object's current location). In addition to this, the message may include information about other parameters associated with the object such as current speed, and direction of motion and/or information about the vicinity of the object such as the layout.

In case the object is a movable object such as a vehicle, pedestrian, or cyclist, the communication device 110 may transmit information messages containing its current position, speed, direction of motion, and identification using for example a Basic Safety Message (BSM) or Cooperative Awareness Message (CAM).

In case the object is an immovable object (e.g., an infrastructure element such as a traffic signal), the communication device 110 may transmit information messages containing the position, identification and state (e.g., signal phase) of the object, and/or the layout in the vicinity of the objection via communication messages such as MAP or Signal Phase and Timing (SPaT) messages (used in V2X communication).

Generally speaking, SPaT messages describe the signal state of an intersection and how long this state will persist for each approach and lane that is active. SPaT messages send the current state of each phase.

MAP messages describe the layout around the object including, e.g., the static physical geometry of one or more intersections, i.e. lane geometries and the allowable vehicle movements for each lane. In other words, it introduces the idea of "intersection data frame" which describes barriers, pedestrian walkways, shared roadways and rail lines that may affect vehicle movements. In certain embodiments, this message may further include complex intersection descriptions and can also describe curved approaches. The contents of this message are at times referred to as the Geometric Intersection Description (GID) layer. The information provided in the MAP messages is usually static, whereas the information in the SPaT messages could be dynamic.

In addition to information about or around the object itself, in certain embodiments, objects 104 may also be configured to communicate information about other objects they can detect in their vicinity (i.e. they may be able to 'pass on' information about objects 104 in their vicinity to other objects in their vicinity). This is helpful when for example not all pedestrians, cyclists or vehicles in a vehicle ecosystem 100 are equipped with communication devices and/or perception recorders. In these cases, objects with perception recorders and communication devices can detect the 'non-connected' objects and provide information about these non-connected objects to other objects 104 and trainers 102 in the vehicle ecosystem 100. In certain embodiments, this information may be transmitted using collective perception messages (CPM).

In V2X communication, the objects 104 and trainers 102 communicate with each other over suitable wireless communication channels/links such as DSRC, ITS-G5 or C-V2X using one or more well-established communication standards such as DSRC-SAE, ITS-G5-ETSI, ISO TC 16, and 3GPP C-V2X. As these devices communicate using standardized communication protocols, the trainers and objects in the vehicle ecosystem 100 can communicate and verify communication in a standardised manner. Thus, a trainer 102 can trust and if necessary verify any communication it receives from communication devices 110. In these communication systems, Public Key Infrastructure (PKI) based security is used to verify and certify messages from sending communication system 110, thus the security and verification concerns with manual classifiers in previously known techniques are solved by design.

Returning to FIG. 1, the computing system 112 may be part of the trainer 102 (i.e. the computing system may be on-board the trainer 102) or it may be communicatively coupled to the perception recorder 106 and communication device 108 of the trainer 102 over a network. When the computing system 112 is on-board, the trainer 102 may be configured to identify and classify objects in real time or as and when needed. In case the computing system 112 is external, the trainer may be configured to transmit recording made by the perception recorder 106 and communication messages received by the communication device 108 to the computing system 112 when is the trainer 102 is communicatively coupled to the computing system 102. And the computing system 112 in turn can process the recordings and messages according to any desired schedule without departing from the scope of the present disclosure.

In any case, the computing system 112 includes a correlator 114 and a classifier 116. The correlator 114 is configured to identify objects. To that end, the correlator 114 receives recordings made by the perception recorder 106 over a period of time and communication messages received by the communication device 108 over that same time period from other objects in the vicinity of the trainer 102. Based on the recordings and the information provided in the received communication messages, the correlator 114 is configured to generate correlated data (i.e. it is configured to correlate objects in the recordings with corresponding communication messages to generate correlated data). Operation of the correlator 114 will be described in detail with reference to FIGS. 2 and 3.

The classifier 116 is configured to add tags to the correlated data. The computing system 112 can then use the tagged correlated data to further train neural networks that may be on-board the trainer 102, in a cloud, or in another trainer in the vicinity of trainer 102. Further, using the systems and methods disclosed herein, the neural network can be trained in real-time or post processing (e.g., daily, weekly or monthly) using the tagged sensor recordings.

For ease of presentation, FIG. 1 illustrates one trainer 102 and three objects 104A, 104B and 104C (in its vicinity). However, it will be appreciated in actual implementation, the number of trainers and objects may be many more than those depicted in FIG. 1. Further, a trainer 102 may be an object 104 in the vicinity of another trainer and any of the objects depicted in FIG. 1 may also be trainers without departing from the scope of the present disclosure. In fact, in preferred embodiments, the 'connected elements' (i.e. elements that are equipped with perception recorders and/or communication devices) in a vehicle ecosystem 100 may be trainers (training their own neural networks based on messages received from other elements) as well as objects (aiding in the training of other elements' neural networks by transmitting messages to these elements).

Example Methods

Figure 2:
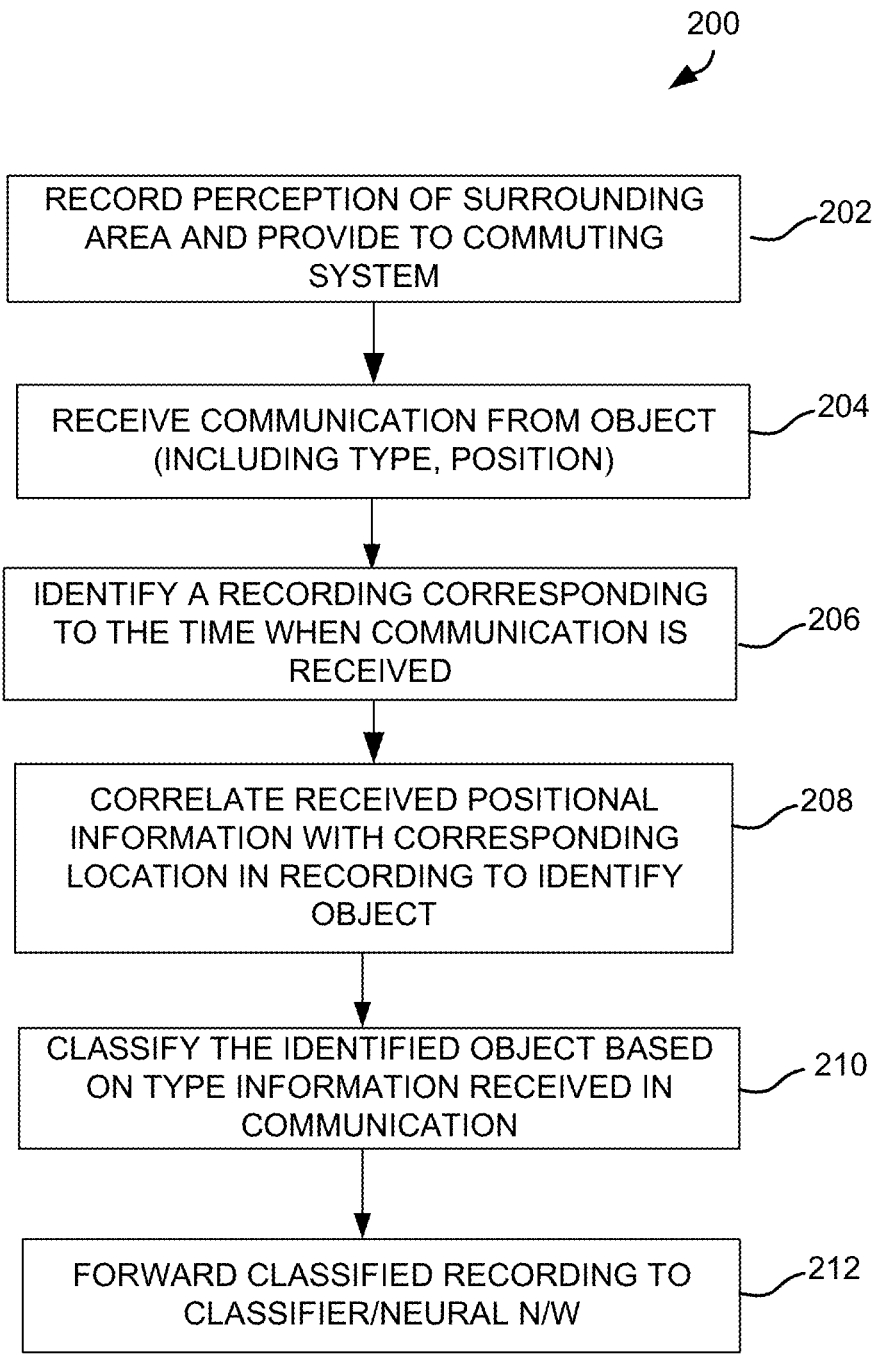
FIG. 2 illustrates an example method according to some aspects of the present disclosure.

FIG. 2 illustrates an example method for identifying and classifying objects 104 in the vicinity of a trainer 102. The method begins at step 202, where one or more perception sensors of the perception recorder 106 scan/monitor an area surrounding the trainer 104.

In one embodiment, the perception sensors may be arranged such that they can monitor an area corresponding to the wireless communication range of the trainer's communication device 108. For example, if the communication device 108 is configured to communicate with other communication devices that are within a 20-meter radius of the trainer 102, the perception sensors may be arranged to monitor the same 20-meter radius around the trainer 102.

Further, it will be appreciated that different perception sensors may be employed to monitor different directions and radii around the trainer 102. For example, a front facing camera may be configured to monitor a 30-degree section at the front of the trainer, whereas a radar sensor may be configured to sense a 20 m radius of 360° around the trainer.

Further still, it will be appreciated that the depth and direction of monitoring will also depend on the positioning and type of trainer 102. For example, if the trainer is a vehicle, it may be important to monitor all 360° around the vehicle, whereas if the trainer is a lamppost, it may be sufficient to monitor 270° around the lamp post facing the street/road.

Preferably, the perception sensors 106 continuously monitor/scan the vicinity of the trainer 102 and make a recording. The recording may also have timing information such as time recording started, time recording stopped. This timing information may be provided per frame (e.g., based on UTC time), etc.

At step 204, the trainer 102 receives a communication message from an object 104 in the vicinity of the trainer. If V2X communication is utilized, when an object 104 is within range of the trainer 102 its communication device 110 may be configured to automatically send one or more messages to the trainer 102 identifying itself and providing its current location/position information. In other embodiments, the communication device 110 may periodically or continuously send broadcast messages that can be received by the trainer's communication device 108 when the trainer 102 is within communication range of the communication device 110.

It will be appreciated that the communication device 110 associated with an object 104 may also be configured to provide additional information such as latitude, longitude, altitude, velocity and direction of motion (if it is a moving object), dimensions of the object (such as length, width etc.), a unique object identifier (e.g. MAC address, or other temporary identifier), object type (car, bus, truck), or state of the object or its surroundings (if it is an infrastructure object). Further, the communication device 110 of the object may be configured to periodically (e.g., every 0.1 second, 1 second, or 5 seconds) send messages with updated information to the trainer 102 while the object is within range of the trainer 102. The one or more received messages are forwarded to the correlator 114.

At step 206, the correlator 114 is configured to identify the object 104. In certain embodiments, this step may be performed in real time (i.e. when a message is received). In alternate embodiments, this step and all following steps may be performed at a later stage (e.g., at the end of a specific period, end of the day, end of the week, etc.).

To identify an object 104, the correlator 114 utilizes the timing and positional information from the received communication messages and sensor recordings. For example, for a given communication message, the correlator may determine the exact time the communication message was sent/received and retrieve a portion of the sensor recording that corresponds to that time. The correlator 114 may then analyse the sensor recording to identify/isolate various objects 104 in the recording. For example, by looking at an image recorded by a video camera coupled to the trainer 102, the correlator 114 may identify an object about 30 meters in front of the trainer, another object on the side of the trainer 40 meters away, etc.

Standard image analysis tools such as range maps may be utilized to isolate objects and determine distance of the isolated objects 104 from the trainer 102. Alternatively, two or more sensors such as video and Lidar could be used to isolate the object in more detail (e.g., more accurately determine the dimensions, distance and depth of an object). For sound recordings, if a given message is received from a car, then the corresponding sound recorded at the time of the given message can be identified and isolated as sound corresponding to the car. Similarly, if the given message is received from a truck, the corresponding sound recorded at the time of the given message can be identified and isolated as sound corresponding to the truck. If two or more vehicles pass by the trainer 102 at the same time, and send communication messages to the trainer 102 at about the same time, the corresponding sound recording can be identified and isolated as sound corresponding to both the vehicles. Further still, radar or LIDAR may be used in combination with an audio sensor/recorder. The radar or LIDAR can be used to e.g., measure distance from the object in line of sight more accurately.

Thereafter, the correlator 114 may match the positional information received in the message with the positional information of the isolated objects in the sensor recording to identify the object that sent the message. To do this, the correlator may compare the location (e.g., GPS coordinates) provided by the object 104 with its own location (e.g., GPS coordinates) to determine the object's location with respect to the trainer 102 and then match this relative position with the position of the isolated objects 104 in a recording made at the same time as the time the corresponding communication message was received.

It will be appreciated that this is just one way for the correlator 114 to identify objects 104. In other techniques, the correlator 114 may not isolate objects in the sensor recording before determining the relative position of the object 104 that sent the communication message. Instead, it may utilize the relative positional information to analyse the portion of the sensor recording that matches the relative position to isolate and identify the corresponding object 104 in the sensor recording.

Once the object 104 is identified, the object may be classified. In certain embodiments, the classifier 116 is configured to classify the identified object using the identification information provided in the message. For example, if the object communicated that it was a BMW 110i hatch, the classifier 116 may be configured to attach that description to the identified object, thereby tagging the sensor recording, which may include both audio and video recording.

Finally, the classified sensor recording may be forwarded to a neural network or fusion network for tracking.

Figure 3:
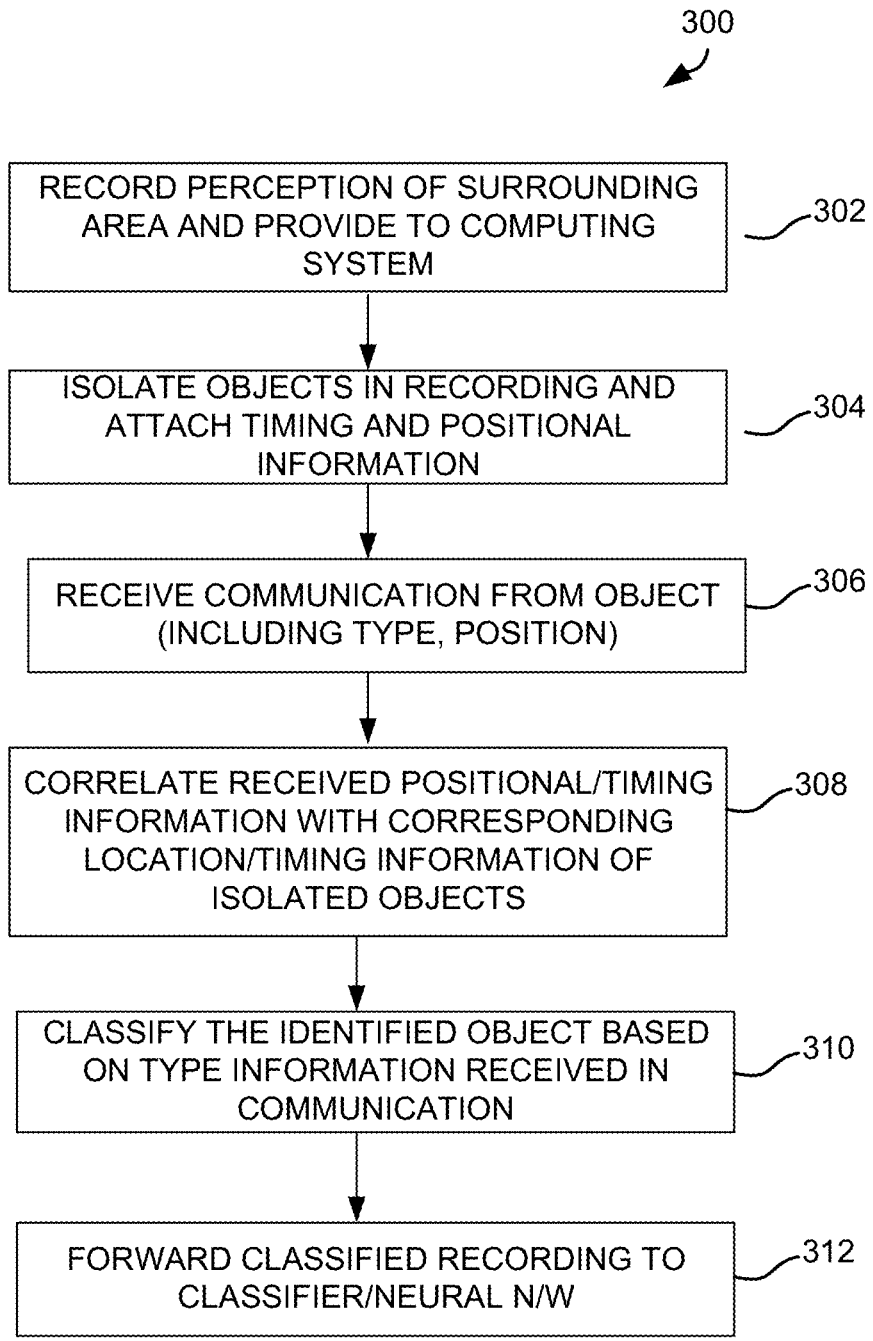
FIG. 3 illustrates an example method according to some aspects of the present disclosure.

FIG. 3 illustrates an alternate method for identifying and classifying objects 104 in the vicinity of a trainer 102. The method begins at step 302, where one or more perception sensors of the perception recorder 106 scan/monitor area surrounding the trainer 102 (similar to step 202 of FIG. 2). In certain embodiments, the perception sensors continuously monitor/scan the vicinity of the trainer 102 and communicate this recording to the correlator 114.

At step 304, the correlator 114 analyses the recording to isolate/identify objects 104 in the recording. This process may be similar to the object isolation/identification process described with reference to FIG. 2. However, once objects are isolated, the correlator 114 is configured to attach position and timing information to each identified object.

At step 306, the trainer 102 receives communication from an object 104. The communication includes e.g., identification and positional information about the object 104. This step is similar to step 204 of FIG. 2.

At step 308, the correlator 114 is configured to identify/classify the object 104. In certain embodiments, this step may be performed in real time (i.e. when the communication message is received from the object). In alternate embodiments, this step and all following steps may be performed at a later stage (e.g., at the end of a specific period, end of the day, end of the week, etc.).

To identify the object, the correlator 114 utilizes the timing and positional information from the received communication message and the isolated/identified object (from step 304). For example, for a given communication message, the correlator 114 determines the time the message was sent/received and retrieves the identified/isolated objects that match the corresponding time. The correlator 114 may then match the position and timing information with the position and timing information for the object isolated in step 304 to identify the object.

Once the object is identified, the object may be classified at step 310. In certain embodiments, the classifier 116 is configured to classify the identified object using the identification information provided in the message. This is similar to step 210 of FIG. 2.

Finally, the classified sensor recording may be forwarded to a neural network for training purposes.

The methods of FIGS. 2 and 3 are described with respect to one object (i.e. identifying and classifying an object in the vicinity of the trainer 102). However, in reality, often more than one object may be present in a trainer's vicinity at any given time and the methods of FIGS. 2 and 3 will be used to identify multiple objects in a given time frame simultaneously.

Examples

The following sections describe various examples of vehicle ecosystems where aspects of the present invention can be implemented.

Figure 4:
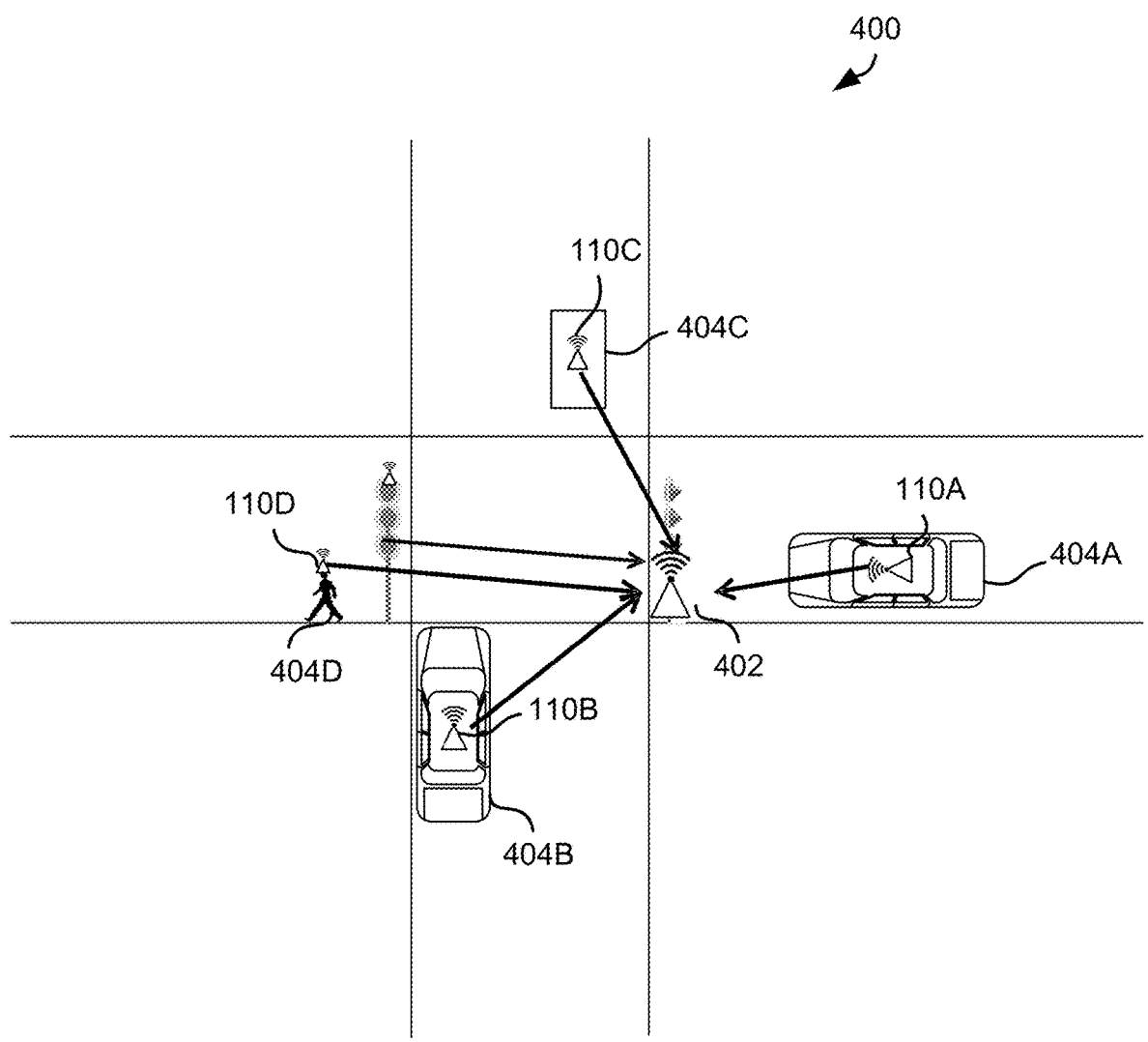
FIG. 4 illustrates an example vehicle ecosystem, where the trainer is an infrastructure element.

FIG. 4 illustrates a first example vehicle ecosystem 400 (i.e. a traffic intersection with a traffic signal 402, cars 404A and 404B, a motorcycle 404C and a pedestrian 404D). In this example, the traffic signal 402 is the trainer, whereas the cars 404A and 404B, motorcycle 404C and pedestrian 404D are objects within range of the trainer. The traffic signal 402 has a road side unit (RSU) as the communication device 108 which is configured to receive and transmit messages from and to the objects 104 within range of the traffic signal 402.

In this example, the perception recorder is a visual perception sensor such as a video camera. In addition, the traffic signal 402 is equipped with an artificial intelligence-based computer system. The traffic signal 402 is configured to use its perception recorder to identify objects 104 within range. The objects—cars, pedestrian and motorcycle, are equipped with communication devices 110 which send position and identification information about their corresponding objects over a communication interface (e.g. V2X) to the RSU of the traffic signal 402. The computing system of the traffic signal 402 is then configured to identify and classify objects based on the video recording and received messages (as described with respect to FIGS. 1-3). This information is then used at the infrastructure end to train its neural network.

Figure 5:
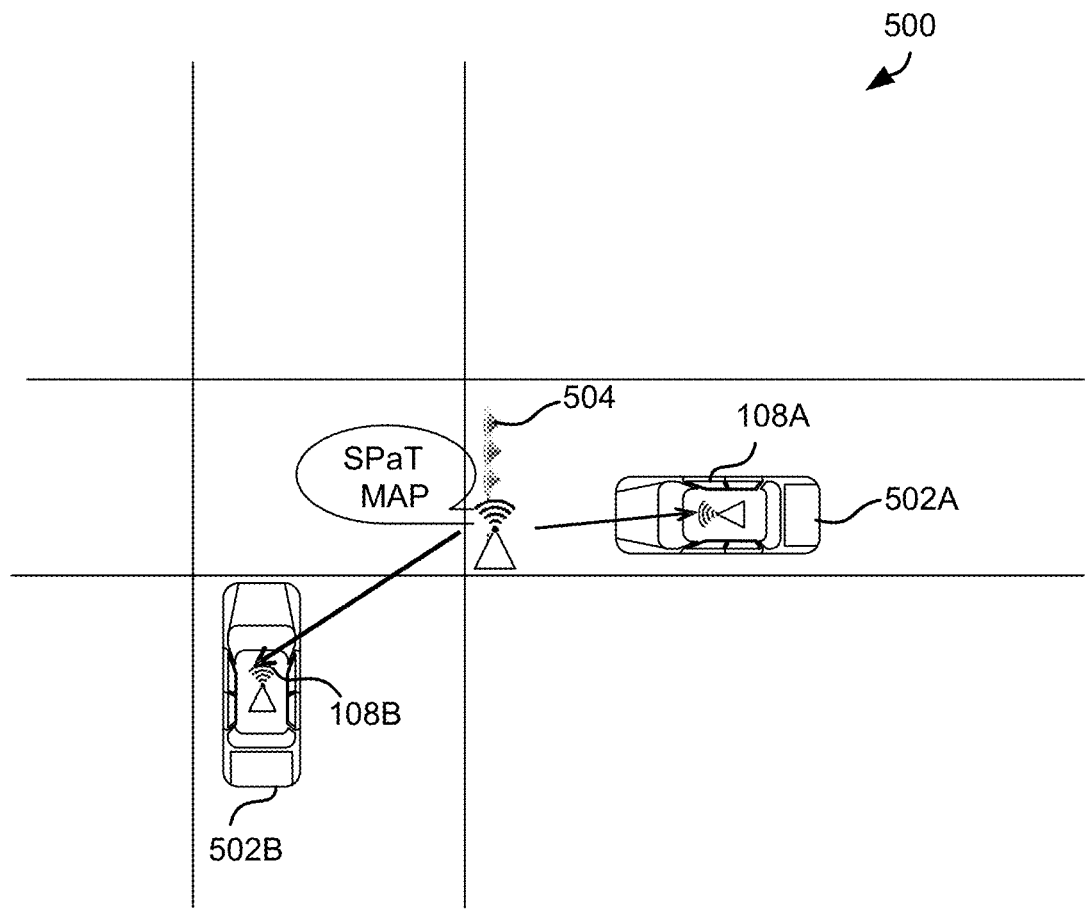
FIG. 5 illustrates an example vehicle ecosystem, where the trainer is a vehicle and the object is an infrastructure element.

FIG. 5 illustrates another example vehicle ecosystem 500 (i.e. a traffic intersection 500 with two vehicles 502A and 502B and a traffic signal 504). In this example, the two vehicles are each trainers, whereas the traffic signal is the object (providing its identification and positional information).

In particular, the RSU (of the traffic signal 504) broadcasts one or more communication messages including information such as traffic signal state or phase (e.g., red, amber, green) and timing information (i.e. when the different phases will change). This information may be broadcasted in the form of SPaT messages in one embodiment. Further, the RSU transmits map data about the local intersection in the form of a MAP message to both the vehicles 502A and 502B when they are within range of the traffic signal 504. Generally speaking, the RSU broadcasts this information onto the incoming traffic (i.e. traffic coming towards the traffic signal 504 from all directions).

The vehicles 502A and 502B (equipped with video sensors), detect the traffic signal 504, each other, and other infrastructure in their vicinity using their perception sensors. Further, each vehicle may transmit communication messages to the other vehicle and the traffic signal may transmit communication messages to both the vehicles. Each vehicle then uses the communication messages received from the traffic signal 504 and the other vehicle and its own perception recordings, to identify and classify objects in its vicinity.

In addition to identifying objects, the vehicles are also able to identify and classify the state of the traffic signal. For example, if vehicle 502 approaches the traffic signal while it is red, the vehicle's perception recorder will obtain an image of the signal when it is red. Then based on the phase and timing information in the SPaT message received from the traffic signal, the vehicle can also classify the phase of the traffic signal (e.g., as red). If vehicle 504 approaches the traffic signal while it is green, it will be appreciated that vehicle 504 will be able to classify the traffic signal in the green phase.

Figure 6:
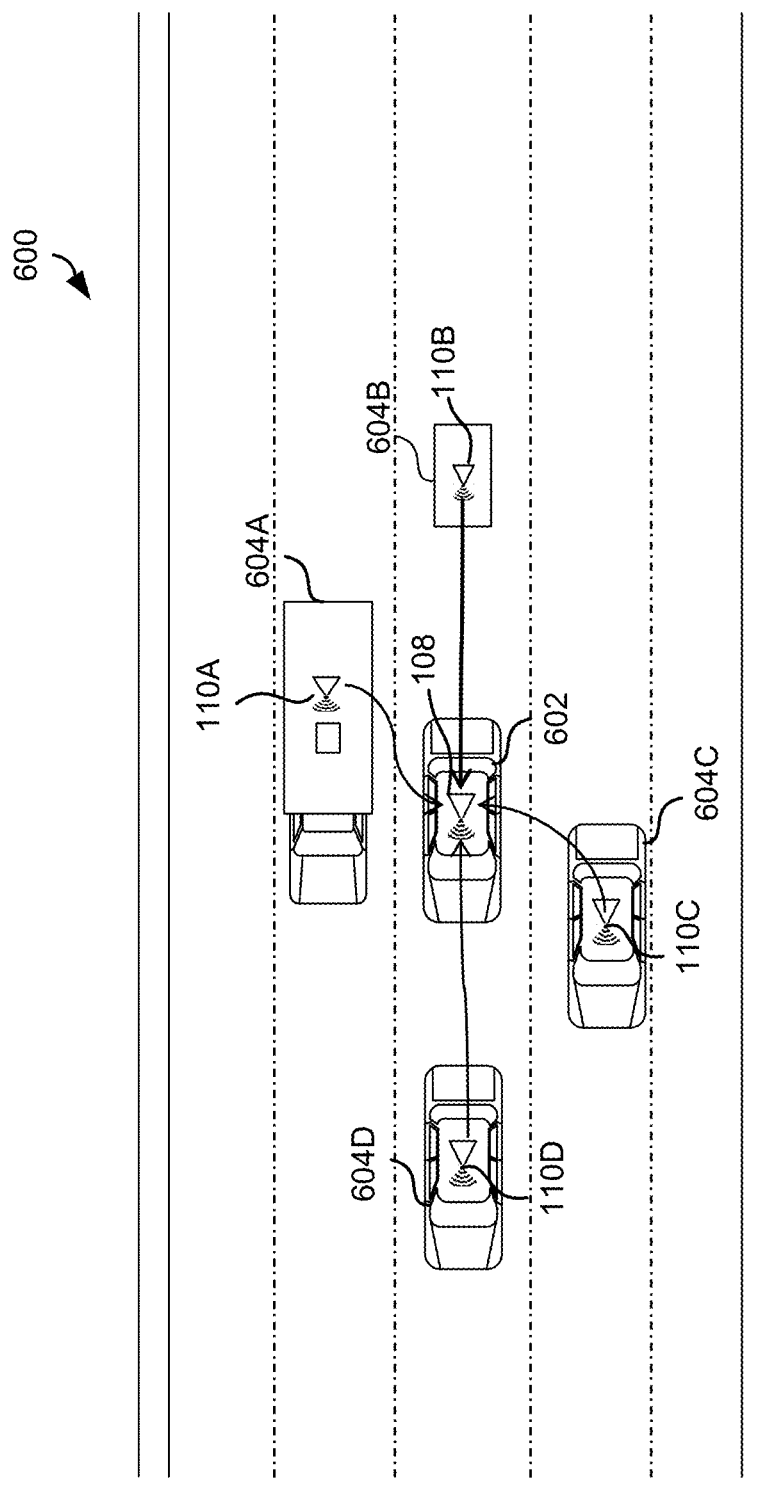
FIG. 6 illustrates an example vehicle ecosystem, where the trainer is a vehicle and the objects are other vehicles.

FIG. 6 illustrates another example vehicle ecosystem 600 with vehicles 602, 604A, 604B, 604C and 604D. In this example, vehicle 602 is the trainer whereas the other vehicles 604A-D are objects that transmit information to the trainer vehicle. In terms of a perception recorder, the trainer vehicle 602 includes an array of visual sensors such as a video camera, a LIDAR, and a radar.

The vehicles 604A-D include V2X capable communication devices (e.g., a radio that can communicate via DSRC, ITS-G5, C-V2X, WiFi or LTE or 5G). The communication devices transmit information about the objects (e.g. vehicle type, dimensions, location, velocity etc.) via communication messages such as BSMs and/or CAMs to the trainer vehicle 602.

As with the other examples, the trainer vehicle 602 uses its perception sensors array (e.g., video, LIDAR, and radar) to isolate the objects 604A-D within range of the perception recorder (e.g. in line of sight visual range). Then based on the communication messages the trainer vehicle 602 receives from the vehicles 604 along with the identified/isolated objects (sensed by its perception recorder), the vehicle 602 classifies and tags the objects. Subsequently, the vehicle's neural network can be trained using the classified objects.

Figure 7:
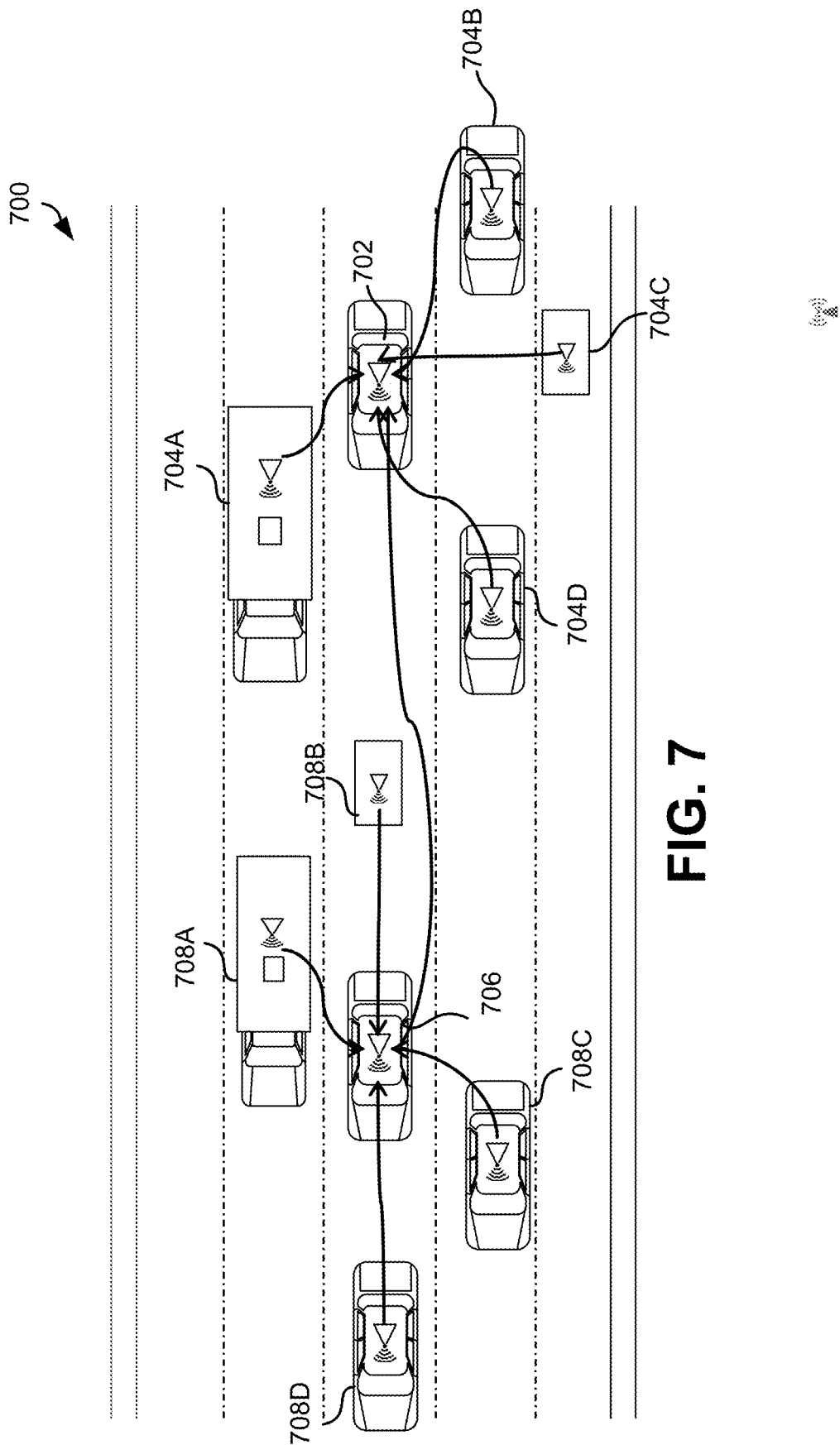
FIG. 7 illustrates an example vehicle ecosystem, where multiple trainers are in communication with each other.

FIG. 7 illustrates an example where classification information from one trainer can be communicated to another trainer to help it train its neural network. In this case, vehicles 702 and 706 are trainers, whereas the other vehicles (704A-D and 708A-D) in FIG. 7 are objects. The trainer vehicles 702 and 706 receive communication messages from the objects within their respective ranges and use these along with their corresponding perception recordings to identify and classify those objects. The trainers 702 and 706 can then communicate data about their classified object recordings to each other.

In another example, consider if object 704D does not have a communication system. In this case, trainer 702 can use its perception sensors to detect this object as a vehicle at a particular location, of a particular type, travelling at a particular velocity and in a particular direction. Trainer 702 can then transmit this information in a collective perception message (CPM) to other objects/trainers in its vicinity that can then utilize information from this CPM message to identify and classify object 704D when this object is detected by the perception recorders of the other objects/trainers.

In the same example, other objects, such as 704B may also be able to detect and identify object 704D using their perception sensors and then transmit this information to other objects and trainers in the vicinity that are enabled with communication devices. By receiving information about object 704D from multiple objects and trainers, more confidence can be ascribed to location and classification of object 704D—e.g. this classification can be ranked higher than a classification received from just one object/trainer. In other embodiments, the trainer 702 and object 704B can provide a confidence level of its classification of object 704D in the collective perception message.

As described previously, collective perception messages (CPM) can be used to distribute information about objects in the surrounding of a particular object, which the distributing object has already identified. For example, in example 2 (FIG. 5), the infrastructure element 504 can identify and tag sensor recordings of the two vehicles and send this information (i.e. the identification of the two vehicles with, their location, speed etc.) in collective perception messages. The vehicles 502A and 502B can then use these perception messages in addition to the communication messages they receive from other objects to either classify the objects identified in the CPM messages or use the CPM message directly. This way, even if car 502B does not have a communication device 110, information about its position, type, and shape is indirectly been transferred by the RSU of object 504 and been used by vehicle 502A to identify and tag that object.

It will be appreciated that to accurately correlate the sensor recordings and the communication messages received from the objects, the timing of the perception sensors and communication devices needs to be synchronized. The C-ITS ecosystem includes a clock synchronization by design. In every communication message (e.g., BSM, CAM, CPM, Spat, or MAP) the time of transmission of the message is present with approximately millisecond or better resolution and is synchronized with GNSS timing. This timing information is shared in a standardised manner. Accordingly, there are standardised ways to map all sources of information into a timeframe such as UTC or local time frame of the receiver. Of course, some way to add a timestamp in all frames in a recording is required but this is usually supported by such systems. Even without any clock synchronization, if a particular trainer records everything in a single receiver clock, the trainer can just use that local clock to co-relate all data in its local time domain (which can be translated to any other time domain if the offset is known).

Reinforcement Learning

In addition to training neural networks to classify objects in the vicinity of a trainer, V2X communication may be utilized to train neural networks to learn driver behaviour and/or automate one or more driving operations of a vehicle. In certain aspects, concepts of behavioural cloning and reinforcement learning may be utilized for such training. Behavioural cloning is a method by which human sub-cognitive skills can be captured and reproduced in a computer program. As a human subject (e.g., a driver) performs the skill (e.g., drives a vehicle), his or her actions are recorded along with the situation that gave rise to the action. A log of these records is used as input to the neural network to train the network to perform the skills like a human subject in particular situations. Reinforcement learning is another area of machine learning concerned with how a computing systems or neural networks ought to take actions in an environment so as to maximize some notion of cumulative reward.

To train a neural network using these techniques, when the trainer is a vehicle, a vehicle condition recorder may be installed in the vehicle. The vehicle condition recorder is configured to record the driver's actions and in particular the condition/state of the vehicle such as its steering angle, speed, acceleration, braking, etc., when a human subject is driving the vehicle. One or more communication devices and/or perception recorders can also be installed in the vehicle and the output of these devices can be used to record the vehicle's surrounding state when the human subject is driving the vehicle.

The data corresponding to the human subject's behaviour can then be correlated with the data corresponding to the vehicle's surrounding state and the correlated data can be used as training data to train the neural network to predict and determine what actions to take when driving the vehicle in a given set of surrounding states. For example, initially, the data about the vehicle's surroundings and its condition can be used to form correlations (e.g., if the vehicle has reached a junction on the road with a red traffic signal and the human subject reduced the vehicle speed until the vehicle had come to a halt 3 meters behind a vehicle in front, the neural network may determine that the optimum vehicle condition when at a red traffic signal road junction is to reduce speed until the vehicle comes to a stop behind another vehicle). It may so happen that at the next junction, the driver may stop the vehicle 2 meters behind another vehicle, or in other situations the driver may change lanes before coming to a halt. The neural network may be configured to apply weights to the vehicle conditions/driver actions whenever new surrounding data is received and over time, after enough data has been collected and weighed, the neural network may learn and apply an optimal action when the vehicle is travelling towards a junction on a road with a red traffic signal.

In a similar manner, the neural network may learn optimal vehicle conditions associated with other surroundings and/or situations (e.g., a right turn, a left turn, a pedestrian crossing, an accident involving other vehicles, road signs, etc.).

Figure 8:
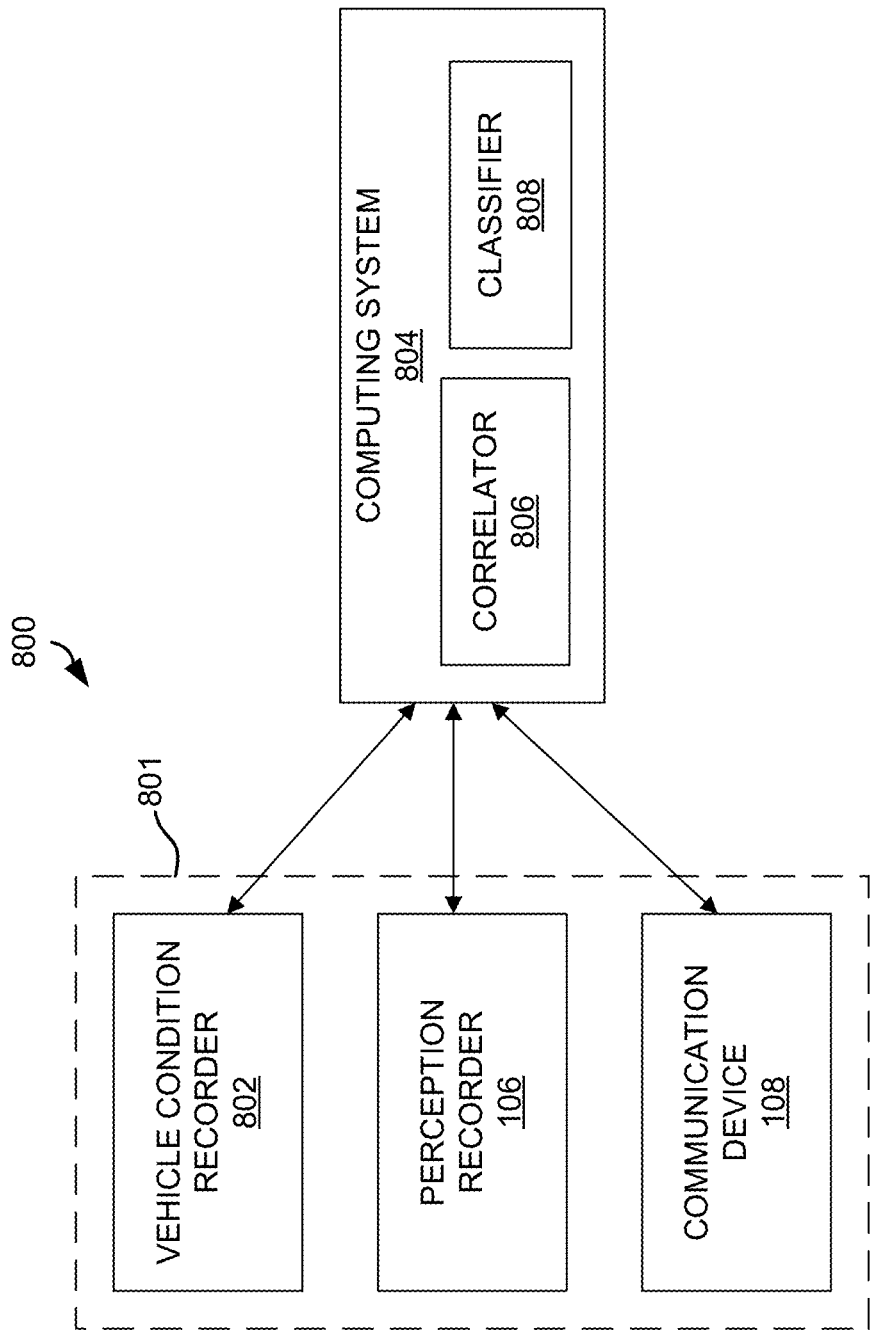
FIG. 8 is a block diagram illustrating an example vehicle neural network training system according to some aspects of the present disclosure.

FIG. 8 illustrates a block diagram of example systems associated with a vehicle 801 for training a neural network associated with the vehicle to automate one or more aspects of driving the vehicle and/or an on-board Advanced Driver Assistance System (ADAS). In particular, FIG. 8 illustrates a vehicle condition recorder 802, a communication device 108, and a computing system 804. The systems may be connected to each other via one or more communication networks (not shown). In addition, in some embodiments, the vehicle 801 may include a perception recorder 106.

The vehicle condition recorder 802 may include any suitable sensors (e.g., speedometer, tachometer, accelerometer, brake sensor, steering angle sensor, etc.) that are configured to detect one or more conditions associated with the vehicle 801 (e.g., speed, steering angle, braking, acceleration, rpm, application of indicators, turning on/off of vehicle lights, use of windscreen wipers, etc.) when the vehicle is in use. It will be appreciated that this list is not exhaustive and there may be other types of vehicle sensors already installed in the vehicle 801 or that may be installed in the vehicle 801 to detect/measure some condition associated with the vehicle 801 during operation and any of these sensors or measurement devices may be considered as part of the vehicle condition recorder 802.

The perception recorder 106 (if included) is configured to monitor/sense a vicinity of the vehicle 801 and forward this to the computing system 804. The perception recorder 106 may include, for example, radars, video cameras, infrared sensors, ultrasonic sensors, light detection and ranging (LIDAR) sensors, and so on. Further, the sensors may be directional (e.g., configured to sense/monitor a few meters in a particular direction) or omnidirectional (e.g., configured to sense/monitor a 360° area around the object in a scanning pattern using phased arrays).

The communication device 108 may be any suitable device associated with the vehicle 801 that is capable of receiving communication messages from other objects in the vehicle's vicinity and transmitting communication messages to other objects in the vicinity. For example, the communication device 108 may be configured to allow vehicle-to-everything (V2X) communication. In other embodiments, the communication device 108 may be configured to allow LTE, C-V2X, and/or WIFI communication without departing from the scope of the present disclosure.

The objects in the vehicle's vicinity may for example be other vehicles, infrastructure elements, motorcyclists, pedestrians, or cyclists. One or more of the objects in the vehicle's vicinity is also equipped with one or more communication devices similar to the communication device 108. When the vehicle 801 is within range of an object that is also equipped with a communication device, the communication device associated with that object automatically sends a message to the vehicle 801. The message may include identification information about the object (e.g., describing what the object is—a lamp post, a traffic signal, a Mitsubishi Lancer, a 10 m bus, etc.), positional information about the object (e.g., GPS coordinates of the object's current location), information about other objects in the vicinity of that object (e.g., describing what the objects are and their positional information). In addition to this, in certain embodiments, the message may include other parameters associated with the object such as current speed, and direction of motion.

In case the object is a movable object such as a vehicle, pedestrian, or cyclist, the communication device 110 may transmit information messages containing its current position, speed, direction of motion, and identification using for example a BSM, CAM, or CPM.

In case the object is an immovable object (e.g., an infrastructure element such as a traffic signal), the communication device 110 may transmit information messages containing the position, identification and state (e.g., signal phase) of the object via communication messages such as MAP, SPaT, or CPM.

In V2X communication, the objects and vehicle 801 communicate with each other over communication channels/links such as DSRC, ITS-G5 or C-V2X using one or more well-established communication standards such as DSRC-SAE, ITS-G5-ETSI, ISO TC 16, and 3GPP C-V2X. As these devices communicate using standardized communication protocols, the vehicle 801 and objects in the vehicle's vicinity can communicate and verify communication in a standardised manner Thus, a vehicle 801 can trust and if necessary verify any communication it receives from the objects in its vicinity.

Returning to FIG. 8, the computing system 804 may be part of the vehicle 801 (i.e. the computing system 804 may be on-board the vehicle 801) or it may be communicatively coupled to the systems on-board the vehicle over a network. When the computing system 804 is on-board, the vehicle 801 may be configured to identify and correlate the vehicle's conditions/driver's actions with the vehicle's surroundings in real time or as and when needed. In case the computing system 804 is external, the vehicle 801 may be configured to transmit data from the vehicle condition recorder 802, the perception recorder 106 and the communication system 108 to the computing system 804 when it is communicatively coupled to the computing system 804. The computing system 804 in turn can process the recordings and messages according to any desired schedule without departing from the scope of the present disclosure.

In any case, the computing system 804 includes a correlator 806 and a classifier 808. The correlator 806 is configured to correlate the vehicle's surrounding state at a particular point in time with the corresponding vehicle state at that particular point in time. In this disclosure the state of the vehicle and the vehicle's surroundings at particular points in time are referred to as vehicle state snapshots and the surrounding state snapshots, respectively.

The correlator 806 receives vehicle state snapshots from the vehicle condition recorder 802 at a particular frequency (e.g., every 0.1 second, every second, every 10 seconds, etc.) and in some embodiments, receives communication messages from the communication device 108 at the same frequency (e.g., every 0.1 second, every second, every 10 seconds, etc. In other embodiments, the vehicle state data and/or the communication messages can be received asynchronously. For instance, different vehicles may transmit V2X messages to the vehicle 801 at different frequencies.

For each point in time, the correlator 806 is configured to determine the vehicle's surround state snapshot based on the information provided in the received communication messages. For example, based on the information received in the V2X communication messages, it may be configured to determine the surrounding state snapshot for a particular point in time to include, e.g., the number of objects in the vehicle's vicinity, the type of objects and their current location. Further, in case of moving objects, the correlator 806 may be configured to determine the heading and/or speed of the moving objects as part of the surrounding state snapshot.

In case the communication messages are received asynchronously and not at the same time as the vehicle state snapshot time, the correlator 806 is configured to align the received communication messages to the current vehicle state snapshot time e.g., by predicting or projecting a state of the object given the information received in the V2X message (such as its current state, heading, and/or trajectory).

In certain embodiments, the information provided in V2X messages may be complemented by perception recordings from one or more perception sensors of the vehicle. Latency due to the computational load of image/LIDAR based tracking is typically negligible. Tracking itself however may introduce a delay and a position error. However, the delay and the position error are both known and quantifiable. Object(s) tracked by a perception recorder (such as LIDAR) can be combined with object(s) identified in a V2X message to accurately identify the position of an object at a given time.

Further, based on the vehicle condition data the correlator 806 is configured to determine the vehicle state snapshot at the corresponding point in time. It is further configured to correlate the vehicle state snapshot with the surrounding state snapshot of the vehicle.

The classifier 808 is configured to add tags to the correlated snapshot data. For example, the classifier may be configured to tag a particular surrounding state snapshot with the vehicle condition information from the vehicle condition snapshot corresponding to that moment in time. The computing system 806 can then use the tagged snapshots to further train neural networks that may be on-board the vehicle, in a cloud, or in another vehicle in the vicinity of vehicle 801. Further, using the systems and methods disclosed herein, the neural network can be trained in real-time or post processing (e.g., daily, weekly or monthly) using the tagged data.

It will be appreciated that in some embodiments the computing system 804 determines the objects and/or layout of the vehicle's surroundings based only on data from the communication system 108, whereas in other embodiments, it may determine the objects and/or layout of the vehicle's surroundings based only on data from the perception recorder 106. For example, in some embodiments, data from the communication device 108 and the vehicle condition recorder 802 may be utilized to correlate the vehicle's surroundings and driver action. In other embodiments, data from the perception recorder 106 may be utilized in conjunction with data from the vehicle condition recorder 802 to correlate the vehicle's surroundings and driver actions.

Figure 9:
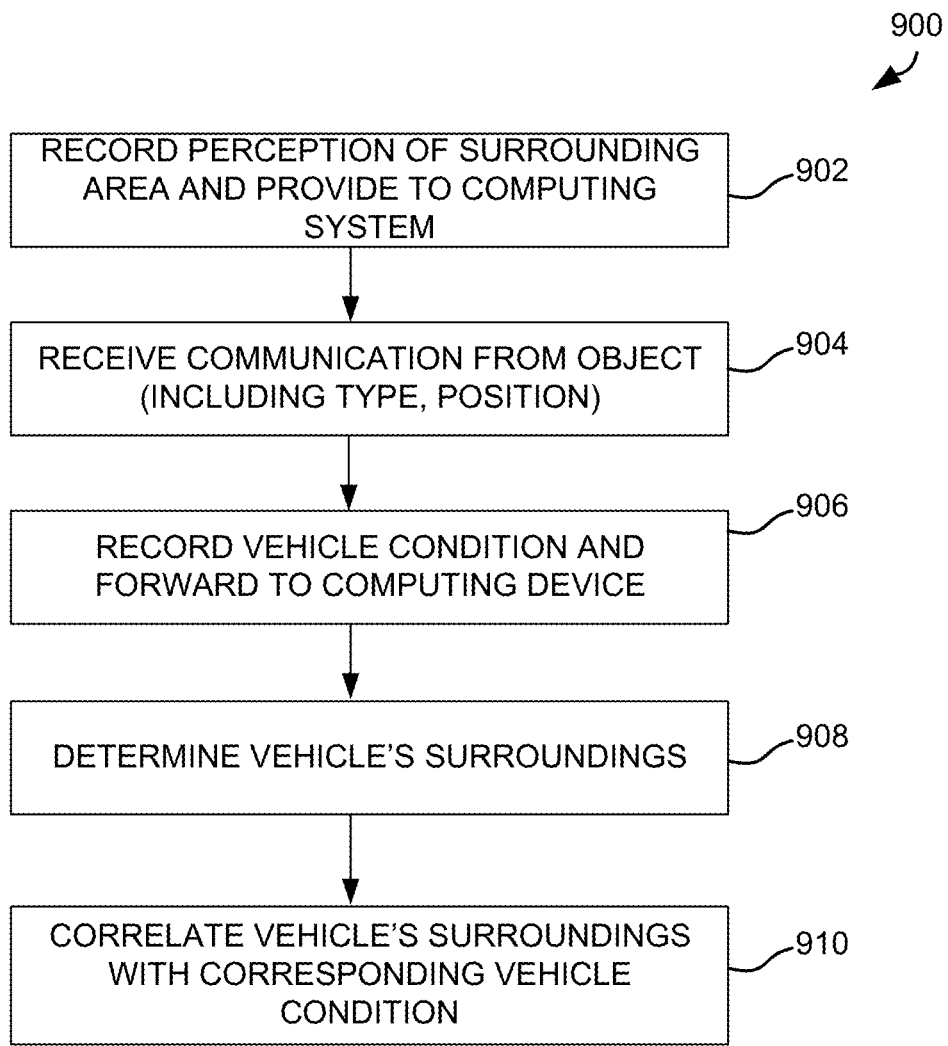
FIG. 9 is a flowchart illustrating an example method for training a neural network according to some aspects of the present disclosure.

FIG. 9 illustrates an example method for training a neural network to learn to automate one or more aspects of driving the vehicle 801. In particular, as described previously, the systems and methods described herein take multiple snapshots of the vehicle condition and corresponding vehicle surroundings and correlate these two to obtain correlated snapshots. These correlated snapshots are then utilized to train the neural network. FIG. 9 illustrates an example method for generating one such correlated snapshot and it will be appreciated that the method is repeated multiple times to create multiple such correlated snapshots.

The method begins at step 902, where one or more perception recorders 106 associated with the trainer scan/monitor an area surrounding the trainer 104. In one embodiment, the perception recorders 106 may be arranged such that they can monitor an area corresponding to the wireless communication range of the vehicle's communication device 108. For example, if the communication device is configured to communicate with devices within a 20-meter radius of the vehicle 801, the perception recorders 106 may be arranged to monitor the same 20-meter radius around the vehicle 801.

Further, it will be appreciated that different perception recorders 106 may be employed to monitor different directions and radii around the vehicle 801. For example, a front facing camera may be configured to monitor a 30-degree section at the front of the vehicle 801, whereas a radar sensor may be configured to sense a 20 m radius of 360° around the vehicle 801.

Preferably, the perception recorder 106 continuously monitors/scans the vicinity of the vehicle 801 and makes a recording including a plurality of image frames and/or sound frames. The recording may also have timing information such as time recording started, time recording stopped, etc. This timing information may be provided per frame (e.g., based on UTC time), etc.

At step 904, the vehicle 801 receives communication from one or more objects in the vicinity of the vehicle. If V2X communication is utilized, when an object is within range of the vehicle 801 its communication device may be configured to automatically send a message to the vehicle's communication device 108 identifying itself and providing any other additional information such as its current location/position information or current location/position of other objects.

It will be appreciated that the object may also be configured to communicate additional information such as latitude, longitude, altitude, velocity and direction of motion (if it is a moving object), uncertainty of position, uncertainty of velocity, dimensions of the object (such as length, width etc.), a unique object identifier (e.g., MAC address, or other temporary identifier), object type (car, bus, truck), or state of the object or its surroundings (if it is an infrastructure object). Further, the communication device of the object may be configured to periodically (e.g., every 0.1 second, 1 second, or 5 seconds) send messages with updated information to the vehicle 801 while the object is within range of the vehicle 801. The one or more received messages are forwarded to the correlator 806.

At step 906, the vehicle condition recorder 802 records vehicle condition information and forwards this information to the computing device 804. As described previously, a driver may perform certain actions while driving the vehicle. For instance, from time to time, the driver may increase or decrease the vehicle speed, apply brakes, turn the vehicle left or right, etc. The vehicle condition recorder 802 is configured to record these actions as variations in the condition of the vehicle in real time or at a predefined frequency. The recording may be forwarded to the correlator 806 in real time or at the predefined frequency, e.g., if the computing system 804 is installed within the vehicle or at a later time, e.g., in case the computing device 804 is operatively connected to the vehicle systems at a later stage.

At step 908, the correlator 806 is configured to determine a surrounding state snapshot of the vehicle 801 based on the received communication message(s) and/or perception recording. In certain embodiments, this step may be performed in real time (i.e. when information from the perception recorder, communication device, and vehicle condition recorder are received). In alternate embodiments, this step and all following steps may be performed at a later stage (e.g., at the end of a specific period, end of the day, end of the week, etc.).

As noted previously, V2X messages typically include information about the object that sent the communication message, information about the state of the object, and/or information about other objects or the layout in the vicinity of the object. The correlator 806 utilizes this information from one or more messages received, e.g., from one or more objects, to determine a consolidated surrounding state snapshot of the vehicle 801. For example, it determines the number of vehicles around vehicle 801, the direction in which these vehicles are headed, the speed of the vehicles, etc. In addition or alternatively, the determined surrounding state snapshot can also include information about infrastructure elements, pedestrians, etc., and the layout of the roads in the vicinity of the vehicle 801. The vehicle surrounding state snapshots may be stored for particular instances of time. For example, surrounding state snapshots may be stored for every second.

At step 910, the correlator 806 is configured to correlate the driver action as he or she manipulates the vehicle controls to generate vehicle condition data with the determined surrounding state of the vehicle. For example, for every surrounding state snapshot, the correlator 806 may retrieve the corresponding vehicle condition data. For example, for a vehicle's surrounding state snapshot taken at 06:05:42 UTC, the correlator 806 may retrieve vehicle condition data recorded at 06:05:42 UTC. For example, it may retrieve the vehicle heading, speed, steering angle data recorded at that time and correlate it with the vehicle's surrounding state snapshot.

This correlated snapshot may then be forwarded to a neural network for training the neural network at step 914.

In some embodiments, if perception data is not provided, method step 902 may be omitted. In that case, the computing system 804 determines the surrounding state of the vehicle based on communication data received from objects in the vicinity of the vehicle 801. The correlator 806 may then correlate this information about the vehicle's surrounding state with the driver's actions based on the vehicle condition/state data.

Further, although method steps 902-906 are illustrated and described as sequential steps, this is not necessarily true. In some embodiments, two or more of these method steps may be performed simultaneously or in a different order without departing from the scope of the present disclosure. For example, data from the perception recorder, vehicle condition recorder and/or communication device in steps 902-906 may be received simultaneously or in a different order.

Once a sufficient number of correlated snapshots are generated and provided to the neural network, the neural network can train itself using a portion of the correlated snapshots. Another portion of the correlated snapshots may be utilized to validate the trained network. For example, to further train the neural network or validate it, the neural network may be incorporated into a vehicle. Real time data about the vehicle's surroundings may be provided to the neural network from the communication device 108 and/or the perception recorder 110 and the neural network may be configured to output a corresponding vehicle state (e.g., optimal vehicle speed and or steering angle) based on the vehicle's surrounding state in real time. The neural network can then be trained by comparing its output (i.e. the neural network's vehicle state information for a particular surrounding state) with actual vehicle condition information received from the vehicle's condition recorder 802. Any difference in the neural network's output from the actual vehicle condition information may be fed back to the neural network to adjust, e.g., weights associated with the correlated snapshots to further fine tune the neural network's output. This process is repeated with multiple data sets in different surrounding states until the neural network can correctly output the correct vehicle state information for a particular surrounding state with a predetermined certainty of, e.g., 90% accuracy. It will be appreciated that the more the process is repeated and the more varied the training set is, the more accurate the network will be. In case of post processing, Datasets from different surrounding states and driving scenarios can be concatenated and shuffled in random order, in order to generalise the network and avoid overfitting of data. A portion of the dataset is used for validation once the training is concluded. The output from this dataset is not fed back to the network.

The trained network is used to predict and/or provide one or more desired driver actions based on a determination of the vehicle's surroundings.

The trained neural network can be used in real time by providing real time data about the vehicle's surrounding from the communication device 108 and/or the perception recorder 110 and the neural network may be configured to output a desired vehicle command (e.g., optimal vehicle speed and or steering angle) based on the vehicle's surroundings in real time which can be used to automate vehicle tasks and/or driver assistance systems (e.g. stopping at traffic lights, platooning, collision avoidance)

A skilled person would appreciate that two or more of the above arrangements may be combined to form combined plausibility determination. For example, the result of plausibility determination from each arrangement may contribute to an individual plausibility metric in order to form a combined or overall plausibility metric.

It will be understood that the disclosure in this specification extends to all alternative combinations of two or more of the individual features mentioned or evident from the text or drawings. All of these different combinations constitute various alternative aspects of the disclosure.

What is claimed is:

1. A method for training a neural network, the method including:
   at a vehicle having a first communication device and a vehicle condition recorder, the first communication device configured to receive communication messages from one or more objects in the vicinity of the vehicle and the vehicle condition recorder configured to continuously record a condition of the vehicle in response to driver actions;
   receiving, at the vehicle, a first communication message from a communication device associated with an object in the vicinity of the vehicle, the first communication message including positional information about the object and information about the type of the object;
   determining a surrounding state of the vehicle based on the received communication message, the surrounding state including at least a position of the object with respect to the vehicle;
   identifying a vehicle state based on the recorded condition of the vehicle corresponding to a time at which the communication message is received from the object;
   correlating the determined surrounding state of the vehicle with the corresponding vehicle state and storing in the form of correlated state data;
   using the correlated state data to train the neural network, the trained neural network configured to output a desired vehicle command based on the vehicle's surrounding in real time.

2. The method of claim 1, wherein determining the surrounding state of the vehicle based on the received communication message further includes:
   identifying a layout of the vicinity of the vehicle.

3. The method of claim 1, wherein the received communication message is a V2X message.

4. The method of claim 1, wherein the vehicle further has a perception recorder continuously recording the surroundings in the vicinity of the vehicle and wherein determining the surrounding state of the vehicle further includes:
   identifying a perception recording corresponding to the time at which the communication message is received from the object;
   identifying one or more objects in the recording; and
   utilizing the identified one or more objects in determining the surrounding state of the vehicle.

5. The method of claim 4, wherein the perception recorder including one or more of a video camera, a sound sensor, an infrared sensor, a radar, or a LIDAR.

6. A system for training a neural network, the system in communication with a first communication device and a vehicle condition recorder of a vehicle, the first communication device configured to receive communication messages from one or more objects in the vicinity of the vehicle and the vehicle condition recorder configured to continuously record a condition of the vehicle in response to driver actions, the system including a processor and a non-transitory computer readable memory, the memory storing instructions which when executed by the processor cause the system to:
   receive, from the first communication device, a first communication message associated with an object in the vicinity of the vehicle, the first communication message including positional information about the object and information about the type of the object;
   determine a surrounding state of the vehicle based on the received communication message, the surrounding state including at least a position of the object with respect to the vehicle;
   receive vehicle state information from the vehicle condition recorder;
   identify a vehicle state corresponding to a time at which the communication message is received from the object based on the received vehicle state information;
   correlate the determined surrounding state of the vehicle with the corresponding vehicle state and store in the form of correlated state data; and
   using the classified correlated state data, train the neural network, wherein the trained neural network configured to output a desired vehicle command based on the vehicle's surroundings in real time.

7. The system of claim 6, wherein the received communication message is a V2X message.

8. The system of claim 6, the system is further configured to identify a layout of the vicinity of the vehicle.

9. The system of claim 6, wherein identifying the vehicle state corresponding to the time at which the communication message is received from the object includes receiving vehicle state snapshots from the vehicle condition recorder at a predetermined frequency.

10. The system of claim 6, wherein the vehicle further has a perception recorder continuously recording the surroundings in the vicinity of the vehicle and wherein to determine the surrounding state of the vehicle, the perception recorder including one or more of a video camera, a sound sensor, an infrared sensor, a radar or a LIDAR, the system is further configured to:
   receive perception recordings from the perception recorder;
   identify a perception recording corresponding to the time at which the communication message is received from the object;
   identify one or more objects in the recording; and
   utilize the identified one or more objects in determining the surrounding state of the vehicle.

11. The system of claim 10, wherein the perception recorder including one or more of a video camera, a sound sensor, an infrared sensor, a radar, or a LIDAR.

12. A non-transitory computer readable medium storing instructions which when executed by a processor cause the processor to:
   receive, from a first communication device, a first communication message associated with an object in the vicinity of a vehicle, the first communication message including positional information about the object and information about the type of the object;
   determine a surrounding state of the vehicle based on the received communication message, the surrounding state including at least a position of the object with respect to the vehicle;
   receive vehicle state information from a vehicle condition recorder;

identify a vehicle state corresponding to a time at which the communication message is received from the object based on the received vehicle state information;

correlate the determined surrounding state of the vehicle with the corresponding vehicle state and store in the form of correlated state data; and using the classified correlated state data, train the neural network, wherein the trained neural network is configured to output a desired vehicle command based on the vehicle's surroundings in real time.

13. The non-transitory computer readable medium of claim 12, wherein the received communication message is a V2X message.

14. The non-transitory computer readable medium of claim 12, further comprising instructions which when executed by the processor cause the processor to identify a layout of the vicinity of the vehicle.

15. The non-transitory computer readable medium of claim 12, wherein identifying the vehicle state corresponding to the time at which the communication message is received from the object includes receiving vehicle state snapshots from the vehicle condition recorder at a predetermined frequency.

16. The non-transitory computer readable medium of claim 12, further comprising instructions which when executed by the processor cause the processor to:

receive perception recordings from a perception recorder;

identify a perception recording corresponding to the time at which the communication message is received from the object;

identify one or more objects in the recording; and utilize the identified one or more objects in determining the surrounding state of the vehicle.

17. The non-transitory computer readable medium of claim 16, wherein the perception recorder continuously records the surroundings in the vicinity of the vehicle and includes one or more of a video camera, a sound sensor, an infrared sensor, a radar or a LIDAR.

* * * * *